United States Patent Office 2,734,782
Patented Feb. 14, 1956

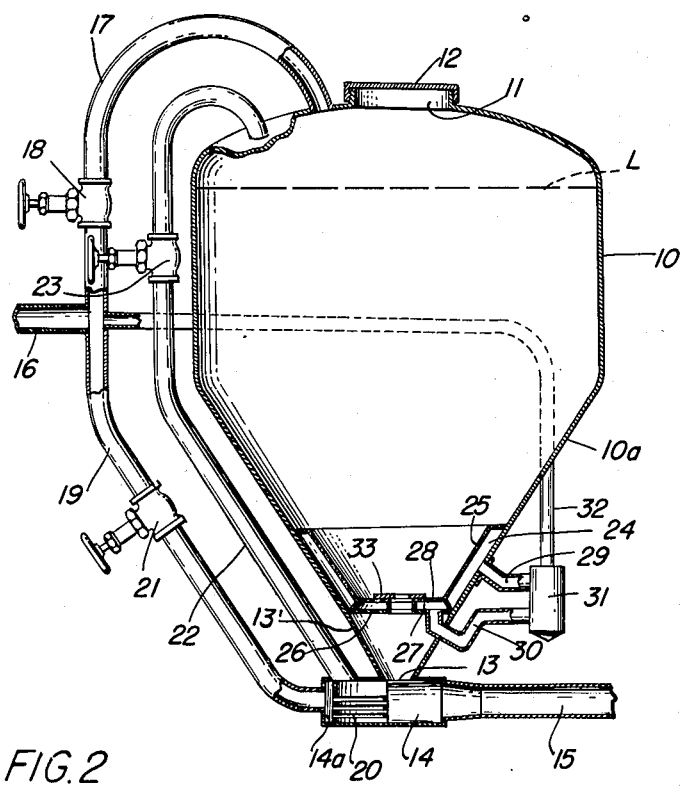
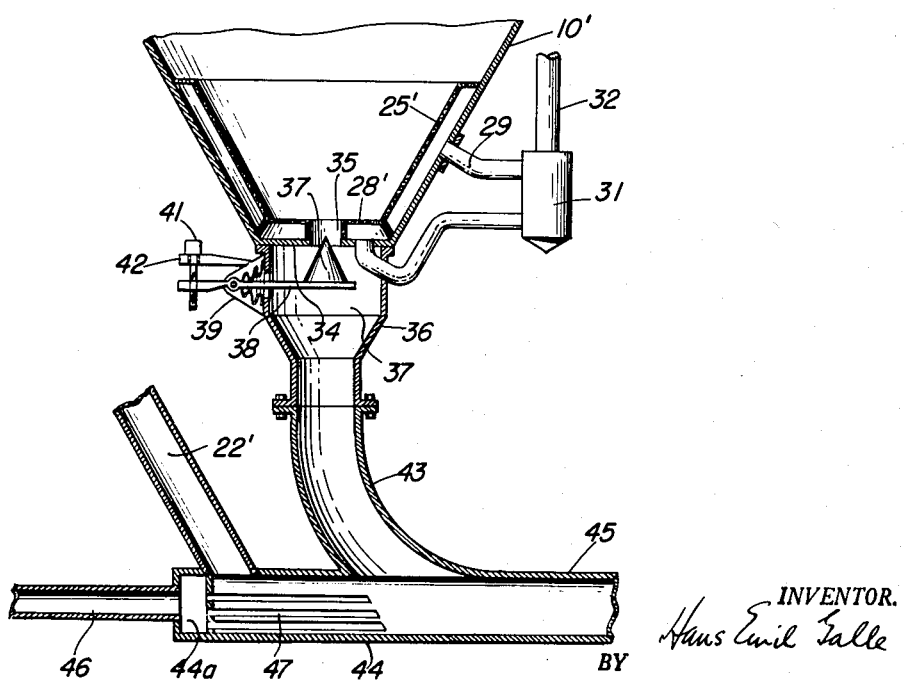

2,734,782

PNEUMATIC CONVEYORS

Hans Emil Galle, Copenhagen, Denmark, assignor to Fuller Company, Catasauqua, Pa., a corporation of Delaware Application June 25, 1953, Serial No. 364,151

8 Claims. (Cl. 302—53)

This invention relates to pneumatic systems for conveying finely divided materials in pulverulent or granular form and of the type, which includes a blow tank connected to a transport line. More particularly, the invention is concerned with a novel pneumatic conveying system, including a blow tank, which is so constructed that the blocking of the line by the surging of material from the tank is avoided.

Pneumatic blow tank conveying systems ordinarily include a tank having a bottom outlet connected to a transport line, a material inlet having a closure, and an inlet for air above the level of the material in the tank. Air is introduced into the line adjacent the tank outlet and, in the use of such a system, material is introduced into the tank through the material inlet to fill it to desired level, following which the inlet is closed and air is introduced into the tank above the material to force the material through the outlet into the line. To facilitate the discharge of the material from the tank into the line, air is sometimes diffused into the material in the tank through porous plates, etc., forming part of the inner surface of the tank to render the material fluent, but materials of small particle size are quite fluent, even when not aerated. In such blow tank systems, difficulties are encountered because the material occasionally rushes from the tank through the outlet into the line in such quantities as to form a seal which blocks the line and cannot be broken by the air supplied to the line for conveying purposes.

The present invention is directed to the provision of a novel blow tank conveying system, which includes means for insuring that the material will flow freely from the blow tank into the line but will not surge into the line to produce a seal stopping the conveying operation. In the new system, the desired results are obtained by providing a connection between the interior of the blow tank about the level of the material and the transport line near the tank outlet, so that the pressure above and below the material is equalized. In addition, the tank is preferably provided with means adjacent the outlet for diffusing air into the material to render the material fluent and the flow of material through the outlet is controlled by an orifice plate defining the opening at the outlet for escape of the material. The plate is removable and replaceable by others to vary the size of the outlet and, if preferred, a valve having a portion entering the orifice to an adjustable extent may be provided to control the rate of flow of the material from the tank into the line.

For a better understanding of the invention, reference may be made to the accompanying drawing, in which Fig. 1 is a view, partly in vertical section and partly in elevation, if the blow tank of the new conveying system; and Fig. 2 is a similar view of features of a blow tank of modified construction.

The conveying system illustrated in Fig. 1 comprises a tank 10 provided at its top with an inlet 11 for material, which can be closed by a closure 12. The lower part 10a of the tank is conical and, at its bottom end, the tank has an outlet 13, which leads, through an intermediate conduit section 13′, into the end section 14 of a transport line 15.

Compressed air for conveying is supplied to the tank and the section 14 of the transport line by a pipe 16, which has a branch 17 leading into the top of the tank adjacent the inlet 11 and provided with a valve 18 for regulating the flow of air through the branch. The line 16 is connected by a second branch 19 to an extension chamber 14a at the end of section 14. The forward wall of the chamber 14a forms means for baffling the air supplied to the section 14. From the chamber 14a the air escapes, at increased velocity, through a plurality of nozzles 20 into the section 14 and the transport line. A regulating valve 21 is mounted in branch 19.

The tank is provided with a pressure-equalizing connection 22, which is connected at one end to the interior of the tank above the normal level L of the material at the start of conveying and contains a regulating valve 23. The other end of the connection 22 is connected to end section 14.

In order to facilitate the flow of material from the tank into the transport line, the material is preferably rendered fluent and, for this purpose, a chamber 24 is mounted on the inner wall of the conical section of the tank, the inner wall of the chamber being formed of porous material 25, which may be filter stone, felt, woven fabric, etc., and is capable of diffusing air into the material. At the lower end of the chamber, the tank is provided with a partition 26 having an opening through it, and an annular chamber 27 having a porous inner wall 28 is mounted upon the partition to surround the opening. Air is supplied to chambers 24 and 27 by branch lines 29, 30 leading from a header 31, which receive air from the supply line 16 through a connection 32. The flow through the opening through partition 26 may be regulated by means of an orifice plate 33, which can be mounted on top of chamber 27 with its orifice in alignment with the opening through partition 26. The plate 33 is replaceable by others having orifices of different size, as required.

In the operation of the conveyor having the blow tank described, material is introduced through the inlet 11 in the tank to approximately the level L and the inlet is then closed by the closure 12. The air is now turned on, so that air enters the material through the porous walls 25, 28 to render the material fluent and air also enters the tank above the level of the material and enters the end section 14 to escape through the nozzles 20 into the transport line 15. A pressure above atmospheric develops in the tank above the material and the same pressure develops in the end section by reason of the use of the equalizing connection 22. Material, which has been rendered fluent by the air supplied through chambers 24, 27, flows through the orifice plate 33 at a rate determined by the head of material above the plate and the size of the orifice. Material issuing through the orifice passes out through the tank outlet 13 and enters the end section 14 of the line where the material is picked up and carried along by jets of air escaping from nozzles 20.

With the construction described, in which equal pressures are developed above the material and below the material, sudden rushes of material through the tank outlet into the pipe line are prevented. In former constructions, in which there was no equalizing connection, the pressure on top of the material in the tank occasionally caused the material to surge through the outlet in such quantities as to seal the transport line so tightly that the seal could not be broken by air pressure. Under such conditions, the conveying stopped and the system had to be opened and the seal removed.

In the modified construction shown in Fig. 2, the lower end of the tank 10′ is provided with a partition 34 formed with the tank outlet opening 35. A housing 36 attached to the lower end of the tank contains a conical valve member 37, which is mounted on a lever 38 pivoted between a pair of ears 39 extending outwardly from the wall of the housing. The lever extends through an opening in the housing wall, which is sealed by a bellows 40 connected to the wall around the opening end to the lever. The position of valve 37 in opening 35 can be varied by means of an adjusting screw 41, which extends through a bracket 42 attached to the ears 39 and enters a threaded opening in the outer end of lever 38.

The lower open end of housing 36 is connected through the curved branch 43 to the end section 44 of transport line 45. The main part of the end section has an extension air chamber 44a, which is similar to chamber 14a of the Fig. 1 construction and serves as a means for supplying air from line 46 to nozzles 47, which are similar to nozzles 20.

The tank 10' may be provided with chambers 25' and 28' having porous walls for diffusion of air into the material. Such chambers are of the same construction and are supplied with air in the same manner as chambers 25 and 28 of Fig. 1.

The tank 10' is provided with a pressure-equalizing connection 22', which leads from the top of the tank above the level of the material to the end section 47 of the transport line. The connection 22' insures that the pressure below the material will equal the pressure on top of the material, so that the material will flow through the tank outlet 35 under the head of material and surging of the material into the pipe line will be prevented.

In the construction shown in Fig. 1, the equalizing connection is shown as leading into the end section 14 of the transport line. It will be apparent that the connection may lead into the tank below partition 26 without change in function or result.

I claim:

1. In a pneumatic system for conveying finely divided material, the combination of a tank having a bottom outlet and an inlet at a higher level, a closure for the inlet, a transport line, intermediate conduit means connecting the transport line with the tank outlet, an extension from the transport line upstream from the junction thereof with said intermediate conduit means, a conduit for introducing air under pressure into an upper portion of the tank, means for introducing air through said extension into the transport line, and a pressure-equalizing connection between the upper portion of the tank and said extension, the cross-sectional area of the extension where the pressure-equalizing connection leads therefrom being greater than the cross-sectional area of the means through which air is introduced into the connection for transport of material, whereby the air in the extension at such place is at a lower pressure than that in said air-introducing means.

2. In a pneumatic conveying system as set forth in claim 1, means for diffusing air into the tank below the level of the material to render the material fluent.

3. In a pneumatic conveying system as set forth in claim 1, a removal orifice plate for controlling the flow of the material through the tank outlet.

4. In a pneumatic system as set forth in claim 1, valve means for controlling flow of material through the tank outlet.

5. In a pneumatic conveying system as set forth in claim 1, a valve mounted to extend into the tank outlet and adjustable to vary the flow of material through the outlet.

6. In a pneumatic conveying system as set forth in claim 1, a conical valve member extending into the tank outlet, and a lever supporting the valve member and movable to adjust the position of the valve member in the outlet and regulate flow of material therethrough.

7. In a pneumatic conveying system as set forth in claim 1, porous means forming the inner wall of the tank adjacent the outlet, and means for diffusing air under pressure through the porous means into the material within the tank to render such material fluent.

8. In a pneumatic conveying system as set forth in claim 1, which includes partitioning means for baffling the supply of air between the conduit for introducing air to the extension and said intermediate conduit, nozzles extending forwardly from said baffling means for increasing the velocity of air passing through said extension for entraining finely-divided material for discharge through the transport line, and in which the pressure-equalizing connection connects with said extension forwardly of said partitioning means.

References Cited in the file of this patent

UNITED STATES PATENTS

| | | |
|---|---|---|
| 984,254 | Akeley | Feb. 14, 1911 |
| 1,535,991 | Crom | Apr. 28, 1925 |
| 1,566,517 | Bergman | Dec. 22, 1925 |
| 1,718,507 | Wenzel | June 25, 1929 |
| 1,796,215 | Peikert | Mar. 10, 1931 |
| 1,933,543 | Anderson | Nov. 7, 1933 |
| 1,991,403 | McManamna | Feb. 19, 1935 |
| 2,565,835 | Adams | Aug. 28, 1951 |